United States Patent
Nakajima et al.

(10) Patent No.: US 8,375,040 B2
(45) Date of Patent: Feb. 12, 2013

(54) CONTENT EXPLAINING APPARATUS AND METHOD

(75) Inventors: Taro Nakajima, Tsurugashima (JP); Naoaki Horiuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 526 days.

(21) Appl. No.: 12/593,235

(22) PCT Filed: Mar. 30, 2007

(86) PCT No.: PCT/JP2007/057132
§ 371 (c)(1),
(2), (4) Date: Sep. 25, 2009

(87) PCT Pub. No.: WO2008/126262
PCT Pub. Date: Oct. 23, 2008

(65) Prior Publication Data
US 2010/0064217 A1    Mar. 11, 2010

(51) Int. Cl.
*G06F 17/00* (2006.01)
(52) U.S. Cl. ............... 707/758; 707/916; 369/30.08
(58) Field of Classification Search .......... 707/758, 707/916; 369/30.08
See application file for complete search history.

(56) References Cited

U.S. PATENT DOCUMENTS
2004/0073625 A1 4/2004 Chatani
2006/0233063 A1 10/2006 Inoue et al.

FOREIGN PATENT DOCUMENTS
| | | |
|---|---|---|
| EP | 1 255 213 A2 | 11/2002 |
| EP | 1 708 200 A1 | 10/2006 |
| JP | 2003-036270 A | 2/2003 |
| JP | 2005-018205 A | 1/2005 |
| JP | 2005-301160 A | 10/2005 |
| JP | 2006-277880 A | 10/2006 |

*Primary Examiner* — Cheyne Ly
(74) *Attorney, Agent, or Firm* — Sughrue Mion, PLLC

(57) ABSTRACT

A content explaining apparatus and method computes the degrees of similarity between a specified content and the other contents than the specified content of multiple contents based on content information stored in content information database means, computes a user realization degree for each of the other contents based on user information stored in user management database means or the content information stored in the content information database means, computes an explanation accuracy degree of each of the other contents for the specified content from the similarity degree and user realization degree of said each of the other contents, and presents content explaining information for the specified content according to the explanation accuracy degrees.

11 Claims, 16 Drawing Sheets

FIG. 2

| BIBLIOGRAPHIC INFORMATION | | | | | |
|---|---|---|---|---|---|
| MUSIC ID | MUSIC TITLE | ARTIST | ARTIST INFO | ALBUM TITLE | ... |
| 1000 | XXX | XXX | XXX | XXX | |
| ... | ... | ... | ... | ... | ... |

ARTIST INFO: TEXT DESCRIBING ARTIST, OR WORD SERIES AFTER LANGUAGE ANALYSIS, etc.

| MUSIC CHARACTERISTIC AMOUNTS | | | | | |
|---|---|---|---|---|---|
| MUSIC ID | KEY | RHYTHM | VOCAL | MELODY | ... |
| 1000 | 4 | 120 | 1 | 3 | |
| ... | ... | ... | ... | ... | ... |

KEY: major (1 to 12: A major, A# major to B major), minor (-1 to -12), etc.
RHYTHM: BEAT AMOUNT PER MINUTE, etc.
VOCAL: 1 MALE, -1 FEMALE, 3 HUSKY & MALE, -3 HUSKY & FEMALE, etc.
MELODY: 1 BRIGHT, 2 SAD, 3 QUIET, 4 GOOD BEAT, etc.

| IMAGE CHARACTERISTIC AMOUNTS | | | | | |
|---|---|---|---|---|---|
| MUSIC ID | PHOTO ID | COLOR | COMPOSITION | MAIN ITEM | ... |
| 10000 | 21 | 230 | 10 | 1 | |
| ... | ... | ... | ... | ... | ... |

COLOR: RGB AVERAGE OF 0 TO 255, etc.
COMPOSITION: INDEX VALUE OF PRESUMED COMPOSITION PATTERN, etc.
MAIN ITEM: 1 FACE, 2 SKY, etc.

| PUBLIC INFORMATION | | | | | |
|---|---|---|---|---|---|
| MUSIC ID | CM USE FREQ. | DRAMA USE FREQ. | SALES RANKING | KARAOKE RANKING | ... |
| 1000 | 120 | 40 | 20 | 10 | |
| ... | ... | ... | ... | ... | ... |

USE FREQ.: OVERALL NUMBER OF REPLAY TIMES IN THE PAST ONE MONTH, etc.
RANKING: HIGHEST RANK VALUE IN THE PAST ONE MONTH, etc.

FIG. 3

| USER INFORMATION | | | | | |
|---|---|---|---|---|---|
| MUSIC ID | LAST PLAY DATE & TIME | PAST NUMBER OF PLAY TIMES | USER EVALUATION | OWNED/UNOWNED | ... |
| 1000 | 2006 0202 173536 | 21 | 3 | 1 | |
| ... | ... | ... | ... | ... | ... |

USER EVALUATION: 1 TO 5 LIKING, 0 NONE, -1 TO -5 DISLIKE, etc.
OWNED/UNOWNED: 1 OWNED, 0 UNOWNED, etc.

FIG.4

| AF(i,j), XF(i,j) | ITEM | CHARACTERISTIC AMOUNT OR INFO | OBJECT OF EVALUATION | OBJECT OF SIMILARITY COMPUTATION |
|---|---|---|---|---|
| j=0 | ARTIST INFO | BIBLIOGRAPHIC INFO | WORD OCCURRENCE FREQ | SAME WORD CO-OCCURRENCE PROBABILITY |
| j=1 | MUSIC TITLE | BIBLIOGRAPHIC INFO | WORD OCCURRENCE FREQ | SAME WORD CO-OCCURRENCE PROBABILITY |
| j=2 | ALBUM TITLE | BIBLIOGRAPHIC INFO | WORD OCCURRENCE FREQ | SAME WORD CO-OCCURRENCE PROBABILITY |
| j=3 | KEY | MUSIC CHAR. AMOUNT | NUMERICAL VALUE | NUMERICAL VALUE COMPARISON |
| j=4 | RHYTHM | MUSIC CHAR. AMOUNT | NUMERICAL VALUE | NUMERICAL VALUE COMPARISON |
| j=5 | VOCAL | MUSIC CHAR. AMOUNT | NUMERICAL VALUE | NUMERICAL VALUE COMPARISON |
| j=6 | MELODY | MUSIC CHAR. AMOUNT | NUMERICAL VALUE | NUMERICAL VALUE COMPARISON |
| j=7 | COLOR | IMAGE CHAR. AMOUNT | NUMERICAL VALUE | NUMERICAL VALUE COMPARISON |
| j=8 | COMPOSITION | IMAGE CHAR. AMOUNT | NUMERICAL VALUE | NUMERICAL VALUE COMPARISON |
| j=9 | MAIN ITEM | IMAGE CHAR. AMOUNT | NUMERICAL VALUE | NUMERICAL VALUE COMPARISON |

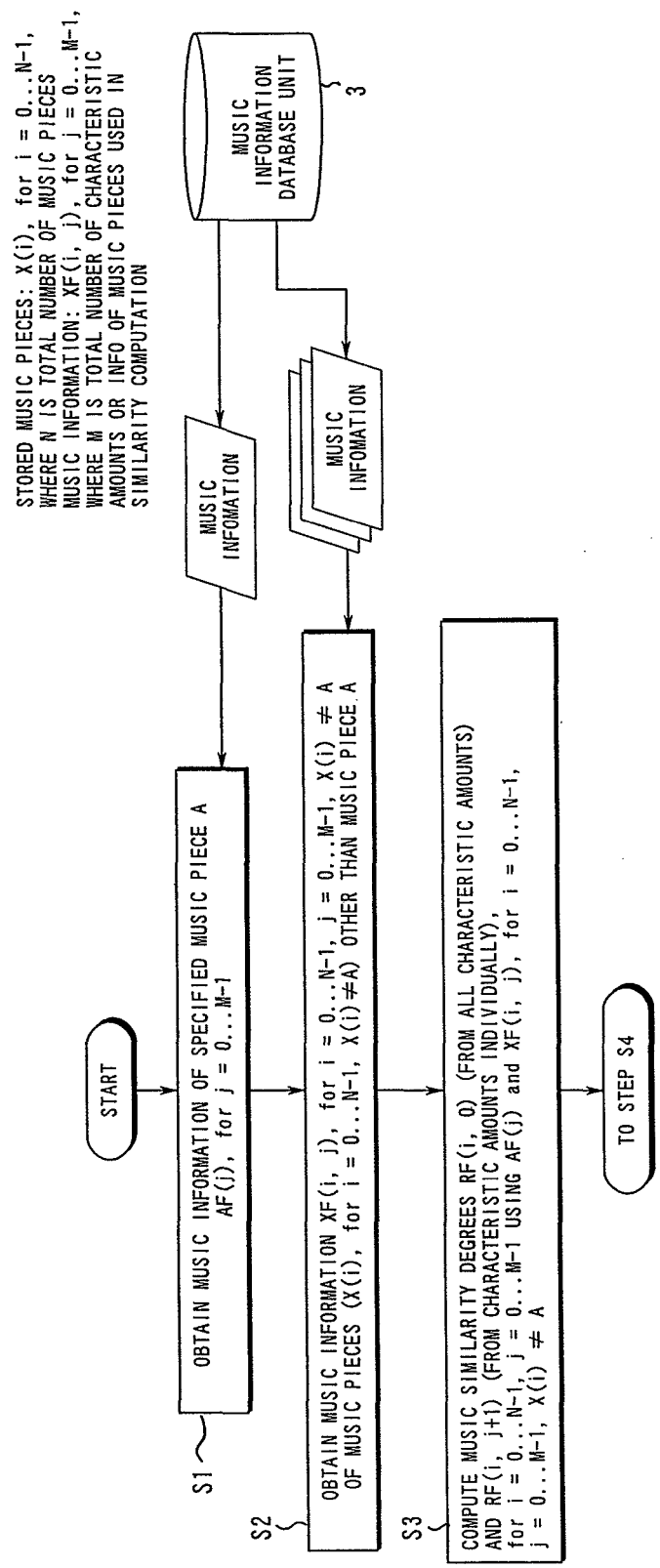

FIG.6

| XU (i, j) | ITEM | OBJECT OF EVALUATION |
|---|---|---|
| j = 0 | ELAPSED TIME FROM LAST PLAY DATE | NUMERICAL VALUE |
| j = 1 | PAST NUMBER OF PLAY TIMES | NUMERICAL VALUE |
| j = 2 | USER EVALUATION | NUMERICAL VALUE |

FIG.7

| XP (i, j) | ITEM | OBJECT OF EVALUATION |
|---|---|---|
| j = 0 | CM USE FREQ. | NUMERICAL VALUE |
| j = 1 | DRAMA USE FREQ. | NUMERICAL VALUE |
| j = 2 | SALES RANKING | NUMERICAL VALUE |
| j = 3 | KARAOKE RANKING | NUMERICAL VALUE |

CONTENT EXPLAINING APPARATUS AND METHOD

TECHNICAL FIELD

The present invention relates to a content explaining apparatus and method for explaining contents such as music pieces.

BACKGROUND ART

With a personal computer or a portable music player, music data of several thousand music pieces can be stored in its recording medium such as an HDD and selectively played for pleasure. Further, an environment is being established where unknown music data is easily obtained via the Internet.

Users have a desire to quickly select various music pieces according to the situation by utilizing the merit that as many as several thousand music pieces including known and unknown ones can be stored. To date, there have been proposed an apparatus for searching for music pieces according to a specified condition such as the preference of a user or a specific musical mood and an apparatus which using a listening history of a user and listening histories of others, outputs a music piece that matches the preference of the user and is unfamiliar to him/her.

For example, in Japanese Patent Application Laid-Open Publication No. 2005-018205 (Reference 1), there is shown a music piece search apparatus which associates the taste degree of a user (the numbers of play times in the past for music pieces, or an input from the user) with characteristic amounts of music pieces according to a predetermined algorithm beforehand and outputs information about a plurality of music pieces similar to each other that match the taste degree of the user at the request of the user.

In Japanese Patent Application Laid-Open Publication No. 2006-277880 (Reference 2), there is shown collaborative filtering which checks a music piece play list owned by a user against a music piece play list owned by another than the user and, if there are music pieces common to both lists, presents information about the other music pieces contained in the other's music piece play list to the user.

Further, in Japanese Patent Application Laid-Open Publication No. 2005-301160 (Reference 3), there is shown an apparatus which determines the impressions of music pieces according to their characteristics beforehand and, when the user specifies a specific impression, outputs information about music pieces matching it.

With these conventional apparatuses, a user can confirm whether the output result is good or bad, that is, whether the result matches the request of the user depending on the music pieces outputted. However, if the output music pieces are unknown, the user needs to listen to them at least once in order to realize their contents.

DISCLOSURE OF THE INVENTION

With these conventional apparatuses, there are the problem that it takes a long time to listen to all the output music pieces and also the problem that if unknown music pieces are outputted and the user does not own them, the user does not have means by which to realize their contents. For example, as to the apparatus of Reference 1, although information about music pieces matching the taste degree is output, it does not comprise means by which to receive the specifying of a music piece by a user, and further the degrees of similarity are confined to those between music piece information pieces outputted by the system. The apparatus of Reference 2 provides information about other persons' music pieces close to the taste of a user based on a play list of the user, but if those music pieces are unknown, the user cannot immediately realize their contents. Further, the apparatus of Reference 3 does not comprise means by which to receive the specifying of a music piece by a user and also does not take the taste degree and realization degree of a user into consideration.

These problems exist with other contents such as movies and books as well as music pieces.

The problems to be solved by the present invention include the above-mentioned shortcomings, and an object of the invention is to provide a content explaining apparatus and method that can present other contents similar to the content specified by a user in such a way as to be easy for the user to realize, and a program to implement the content explaining method.

A content explaining apparatus according to a preferred embodiment is an apparatus for explaining a content, comprising: content specifying means for specifying a content to be explained from among a plurality of contents; content information database means for storing content information concerning each of the plurality of contents; user management database means for storing user information concerning each of the plurality of contents; similarity degree computing means for computing a degree of similarity between the content specified by the content specifying means and each remaining content other than the specified content of the plurality of contents based on the content information stored in the content information database means; user realization degree computing means for computing a user realization degree for each remaining content based on the user information stored in the user management database means or the content information stored in the content information database means; explanation accuracy degree computing means for computing a degree indicating an explanation level for the specified content of each remaining content as an explanation accuracy degree based on a computing result of the similarity degree computing means and a computing result of the user realization degree computing means; and explanation presenting means for presenting content explaining information for the specified content in accordance with explanation accuracy degrees that are computing results of the explanation accuracy degree computing means.

A content explaining method according to a preferred embodiment is a method of explaining a content, comprising: a content specifying step of specifying a content to be explained from among a plurality of contents; a similarity degree computing step of computing a degree of similarity between the content specified in the content specifying step and each remaining content other than the specified content of the plurality of contents based on content information stored in content information database means; a user realization degree computing step of computing a user realization degree for each remaining content based on user information stored in user management database means or the content information stored in the content information database means; an explanation accuracy degree computing step of computing a degree indicating an explanation level for the specified content of each remaining content as an explanation accuracy degree based on a computing result of the similarity degree computing step and a computing result of the user realization degree computing step; and an explanation presenting step of presenting content explaining information for the specified content in accordance with explanation accuracy degrees that are computing results of the explanation accuracy degree computing step.

A program according to a preferred embodiment is a computer program stored in a computer-readable medium to execute a content explaining method of explaining a content, the program comprising: a content specifying step of specifying a content to be explained from among a plurality of contents; a similarity degree computing step of computing a degree of similarity between the content specified in the content specifying step and each remaining content other than the specified content of the plurality of contents based on content information stored in content information database means; a user realization degree computing step of computing a user realization degree for each remaining content based on user information stored in user management database means or the content information stored in the content information database means; an explanation accuracy degree computing step of computing a degree indicating an explanation level for the specified content of each remaining content as an explanation accuracy degree based on a computing result of the similarity degree computing step and a computing result of the user realization degree computing step; and an explanation presenting step of presenting content explaining information for the specified content in accordance with explanation accuracy degrees that are computing results of the explanation accuracy degree computing step.

BRIEF DESCRIPTION OF DRAWINGS

FIG. 2 shows an example of music information stored in a music information database unit;

FIG. 3 shows an example of user information stored in a user management database unit;

FIG. 4 shows an example of music information XF(i, j) and AF(j);

FIG. 5 is a flow chart showing a similarity degree computation operation;

FIG. 6 shows an example of user information XU(i, j);

FIG. 7 shows an example of public information XP(i, j);

EXPLANATION OF REFERENCE NUMERALS

Figure 1:
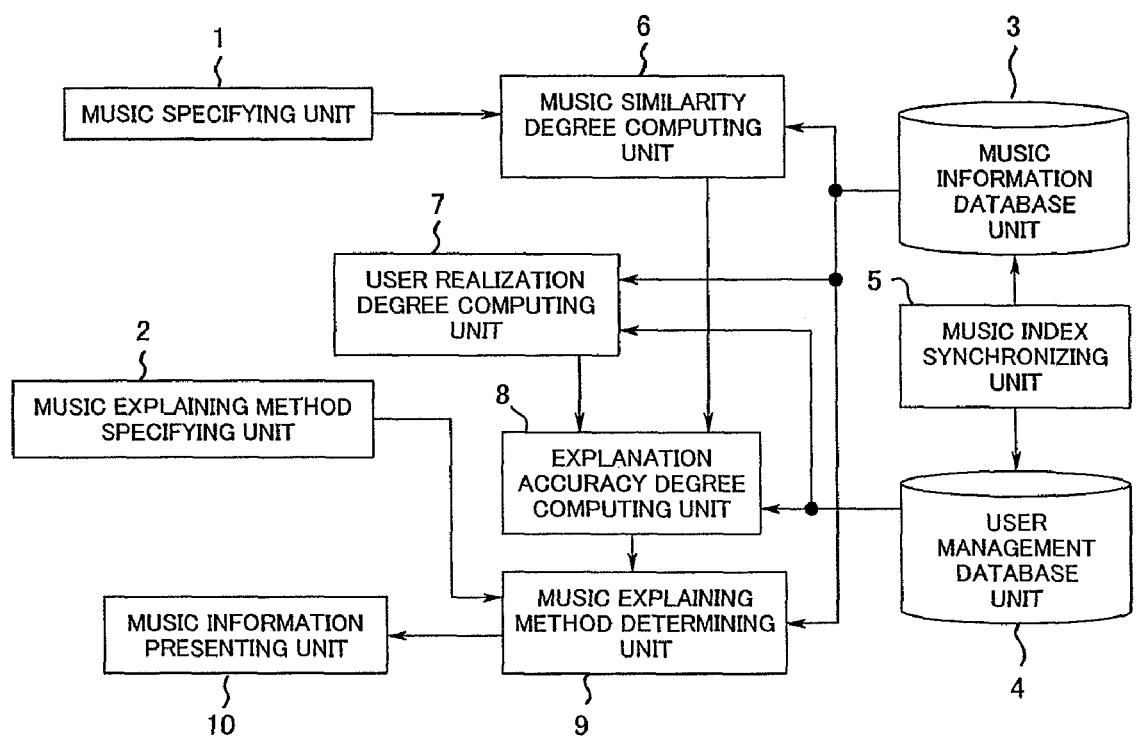
FIG. 1 is a block diagram showing the configuration music piece explaining apparatus according to the present invention.

1 Music specifying unit
2 Music explaining method specifying unit
3 Music information database unit
4 User management database unit
5 Music index synchronizing unit
6 Music similarity degree computing unit
7 User realization degree computing unit
8 Explanation accuracy degree computing unit
9 Music explaining method determining unit
10 Music information presenting unit

BEST MODE FOR CARRYING OUT THE INVENTION

In som preferred embodiments, the degrees of similarity between the content specified by a user and the other contents than the content specified by the user of multiple contents are computed based on content information stored in content information database means, and for each of the other contents, a user realization degree is computed based on user information stored in user management database means or the content information stored in the content information database means. For each of the other contents, the degree of explanation accuracy for the specified content is computed based on the computed degree of similarity and user realization degree for the other content. Since each degree of explanation accuracy indicates the degree to which to deserve explanation of a corresponding one of the other contents, other contents can be presented as content explanation information for the specified content according to their degrees of explanation accuracy. Thus, even if the specified content is unknown, the user can easily realize the specified content in a short time through the content explanation information, i.e., other contents similar thereto without actually listening to and watching the specified content itself to confirm.

EMBODIMENTS

Embodiments of the present invention will be described in detail below with reference to the drawings.

FIG. 1 shows a music piece explaining apparatus as an embodiment of the present invention. This music piece explaining apparatus comprises a music specifying unit 1, a music explaining method specifying unit 2, a music information database unit 3, a user management database unit 4, a music index synchronizing unit 5, a music similarity degree computing unit 6, a user realization degree computing unit 7, an explanation accuracy degree computing unit 8, a music explaining method determining unit 9, and a music information presenting unit 10.

The music specifying unit 1 is content specifying means and specifies a music piece of which the user needs the explanation. The music explaining method specifying unit 2 specifies a final music explaining method for the music piece specified by the music specifying unit 1 according to the selection by the user. The music explaining method specifying unit 2 together with the music explaining method determining unit 9 and the music information presenting unit 10 forms explanation presenting means.

The music information database unit 3 is content information database means and stores various music piece information including at least bibliographic information, music characteristic amounts, image characteristic amounts, and public information. FIG. 2 shows an example of the bibliographic information, music characteristic amounts, image characteristic amounts, and public information about a music piece (music ID: 1000) stored in the music information database unit 3.

The user management database unit 4 is user management database means, which is a database storing, for each user, a play history and owned/unowned information for the music pieces present in the music information database unit 3. As far as information about users for the music pieces is concerned, it is handled as being for the user management database unit 4. FIG. 3 shows an example of user information about the music piece (music ID: 1000) stored in the user management database unit 4.

The music index synchronizing unit 5 associates the music information database unit 3 with the user management database unit 4 in terms of music piece index members (music IDs). Namely, when new music piece information together with a music ID is added to the music information database unit 3, the same music ID is also added to the user management database unit 4, and a data storage area is secured for that music ID.

The music similarity degree computing unit 6 is content similarity degree computing means and computes the degrees of music similarity between the specified music piece and other music pieces for a music piece specified by the music specifying unit 1. This computation uses all except public information of the music information of each music piece stored in the music information database unit 3.

The user realization degree computing unit 7 is user realization degree computing means and computes ease for the user to realize, i.e. the degrees of user realization, for all the music pieces stored in the music information database unit 3. This computation uses the public information of the music information of each music piece stored in the music information database unit 3 and the user information of each music piece stored in the user management database unit 4.

The explanation accuracy degree computing unit 8 is explanation accuracy degree computing means and computes the degrees of explanation accuracy, for the music piece specified by the music specifying unit 1, of all the music pieces stored in the music information database unit 3, using the computing results of the music similarity degree computing unit 6 and of the user realization degree computing unit 7. Namely, music pieces similar in music information (music characteristics, bibliographic information, the characteristics of an image such as a jacket photo, etc.) to the music piece specified by the user and easy for the user to realize are ranked in order.

The music explaining method determining unit 9 determines, for a group of the music pieces of higher explanation accuracy degrees obtained by the explanation accuracy degree computing unit 8, whether to output the music information of the highest explanation accuracy degree or the proportions of artists belonging to the music piece group based on specification from the music explaining method specifying unit 2.

The music information presenting unit 10 presents music information output from the music explaining method determining unit 9 on the screen of a display (not shown).

Next, the operation of the music piece explaining apparatus of this configuration will be described.

First, a music piece is specified according to the operation of the user, and the music specifying unit 1 supplies data indicating the specified music piece to the music similarity degree computing unit 6, which computes a degree of similarity between the specified music piece and each music piece stored in the music information database unit 3.

Music information about all known music pieces is stored in the music information database unit 3. Let X be that set and $X(i)$ be a music piece belonging to X, where $i=0, \ldots, N$ and N is the total number of the music pieces. Let $XF(i, j)$ (where $j=0, \ldots, M-1$) be music information of music piece $X(i)$, M being the total number of music information attributes. Let A be the music piece specified by the user, A belonging to X, and $AF(j)$ (where $j=0, \ldots, M-1$) be music information of music piece A. In an example of the music information $XF(i, j)$ and $AF(j)$, as shown in FIG. 4, for each of their attributes ($j=0$ to 9), an item, a characteristic amount or information, an object of evaluation, and an object of similarity computation are decided on.

In the similarity degree computation operation, as shown in FIG. 5, first the music information $AF(j)$ of the specified music piece A is obtained from the music information database unit 3 (step S1). Further, the music information $XF(i, j)$ of music pieces $X(i)$ (where $i=0, \ldots, N$) other than music piece A are obtained from the music information database unit 3 (step S2). Then, the similarity degrees $RF(i, j)$ between music piece A and music pieces $X(i)$ are computed using the music information $AF(j)$ and the music information $XF(i, j)$ (step S3).

Here, let $RF(i, j)$ (where $i=0, \ldots, N-1$ and $j=0, \ldots, M$) denote the music similarity degrees between music piece A and the other music pieces $X(i)$, where $X(i) \neq A$. For $j=0$, the similarity degrees for all the music attributes ($j=0, \ldots, M-1$) of the music information $AF(j)$ and $XF(i, j)$ are calculated and stored as $RF(i, 0)$. For $j=1, \ldots, M$, the similarity degrees for individual music attributes ($j=0, \ldots, M-1$) of $AF(j)$ and $XF(i, j)$ are calculated and stored respectively as $RF(i, j+1)$, where $j=0, \ldots, M-1$. In the case of the distance index of a multi-dimensional vector, Euclidean distance, cosine distance, Mahalanobis distance, or the like may be used as the method of computing the music similarity degrees. Where Euclidean distance is adopted, the calculation formulas are the equations (1a), (1b):

[Expression 1]

$$RF(i, 0) = \begin{cases} \sum_{j}^{M-1} \left| \sqrt{(AF(j) - XF(i, j))^2} \right|, & A \neq X(i) \\ -1, & A = X(i) \end{cases} \quad (1a)$$

for $i = 0 \ldots N-1$ $$RF(i, j+1) = \begin{cases} \left| \sqrt{(AF(j) - XF(i, j))^2} \right|, & A \neq X(i) \\ -1, & A = X(i) \end{cases} \quad (1b)$$

for $i = 0 \ldots N-1$,
$j = 0 \ldots M-1$

In the similarity degree computation, for ones of the music attributes that are expressed in a numerical value as shown for $j=3$ to 9 in FIG. 4, the difference may be calculated, and for ones expressed in words as shown for $j=0$ to 2 in FIG. 4, the occurrence frequency of words included in $AF(j)$ and $XF(i, j)$ in common may be calculated.

After the similarity degree computation, the user realization degree computing unit 7 performs a user realization degree computation operation. The user realization degree computation operation is performed on each of the music pieces stored in the music information database unit 3.

First, let XU(i, j) (where i=0, ..., N−1; j=0, ..., K−1) be the user information of music piece X(i), where i=0, ..., N−1. K is the total number of user information attributes stored in the user management database unit 4. Further, let XP(i, j) (where i=0, ..., N−1; j=0, ..., L−1) be the public information of music piece X(i), where i=0, ..., N−1. L is the total number of public information attributes stored in the music information database unit 3. In an example of the user information XU(i, j), as shown in FIG. 6, for each of its attributes (j=0 to 2), an item and an object of evaluation are determined based on the music information in the music information database unit 3 of FIG. 2. In addition, In an example of the public information XP(i, j), as shown in FIG. 7, for each of its attributes (j=0 to 3), an item and an object of evaluation are determined based on the user information in the user management database unit 4 of FIG. 3.

Further, let XURG(i) and XPRG(i), where i=0, ..., N−1, be a personal realization degree and a public realization degree as two types of user realization degrees respectively. The personal realization degree is individual information for one user and indicates the degree of individual familiarity for a music piece represented in the listening history and the like. In contrast, the public realization degree is determined by public and external factors such as broadcasts in CM, a drama, or the street, irrespective of individual listening tendencies and represents the degree of potential familiarity with the music piece on the basis of experience such as often-hearing and is used when the personal realization degree is low.

Figure 8:
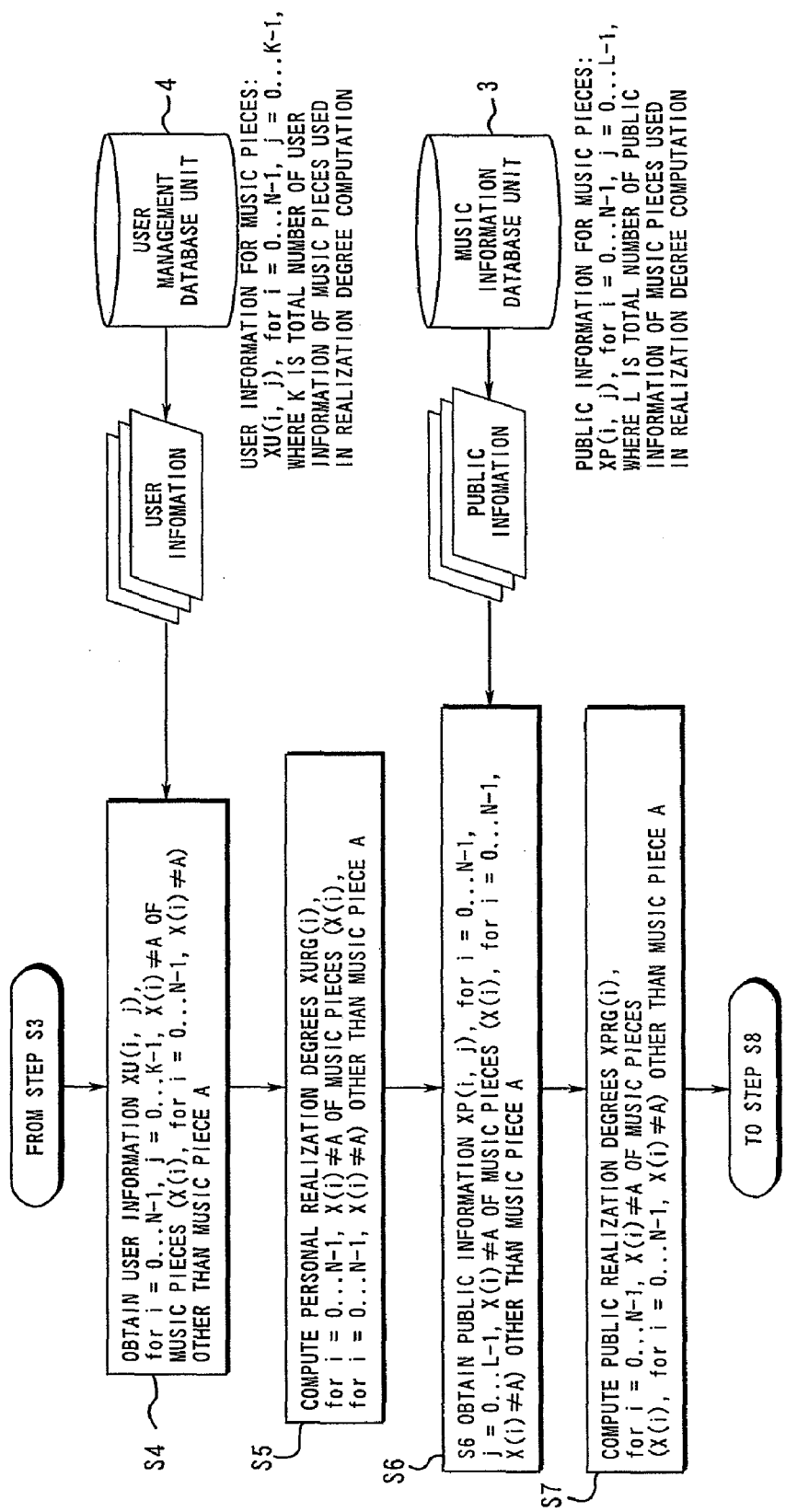
FIG. 8 is a flow chart showing a user realization degree computation operation.

In the user realization degree computation operation, as shown in FIG. 8, first the user information XU(i, j) (where i=0, ..., N−1; j=0, ..., K−1; X(i)≠A) of music pieces X(i) (where i=0, ..., N−1; X(i)≠A) other than music piece A are obtained from the user management database unit 4 (step S4). Then, the personal realization degrees XURG(i) (where i=0, ..., N−1; X(i)≠A) of music pieces X(i) (where i=0, ..., N−1; X(i)≠A) other than music piece A are computed (step S5). In order to compute the personal realization degree, the following equation (2) is used, where WU(i) (where i=0, ..., K−1) are adjustable parameters denoting the weightings of the attributes respectively:

[Expression 2]

$$XURG(i) = \begin{cases} \sum_{j=0}^{K-1} XU(i, j) \times WU(j), & A \neq X(i) \\ -1, & A = X(i) \end{cases} \quad (2)$$

for $i = 0 \dots N - 1$

Further, the public information XP(i, j) (where i=0, ..., N−1; j=0, ..., L−1; X(i)≠A) of music pieces X(i) (where i=0, ..., N−1; X(i)≠A) other than music piece A are obtained from the music information database unit 3 (step S6). Then, the public realization degrees XPRG(i) (where i=0, ..., N−1; X(i)≠A) of music pieces X(i) (where i=0, ..., N−1; X(i)≠A) other than music piece A are computed (step S7). In order to compute the public realization degree, the following equation (3) is used, where WP(i) (where i=0, ..., L−1) are adjustable parameters denoting the weightings of the attributes respectively:

[Expression 3]

$$XPRG(i) = \begin{cases} \sum_{j=0}^{L-1} XP(i, j) \times WP(j), & A \neq X(i) \\ -1, & A = X(i) \end{cases} \quad (3)$$

for $i = 0 \dots N - 1$

Note that the equations (2), (3) are for general cases and that where information in the music information database unit 3 is like the music information of FIG. 2, information in the user management database unit 4 is like the user information of FIG. 3, XU(i, j) and XP(i, j) are based on information of FIG. 4, and there is a difference in meaning between the magnitude of the numerical value of each attribute and the realization degree, the personal realization degrees XURG(i) and the public realization degrees XPRG(i) can be computed from the equations (4), (5) according to the number and properties of attributes:

[Expression 4]

$$XURG(i) = \begin{cases} (1/XU(i, 0)) \times WU(0) + XU(i, 1) \times & A \neq X(i) \\ WU(1) + |XU(i, 2)| \times WU(2), & \\ -1, & A = X(i) \end{cases} \quad (4)$$

for $i = 0 \dots N - 1$

[Expression 5]

$$XPRG(i) = \begin{cases} \sum_{j=0}^{3} XP(i, j) \times WP(j), & A \neq X(i) \\ -1, & A = X(i) \end{cases} \quad (5)$$

for $i = 0 \dots N - 1$

After the user realization degree computation, an explanation accuracy degree computation operation is performed in the explanation accuracy degree computing unit 8. Hereinafter, the degree to which each music piece registered in the music information database unit 3 deserves explanation (being presented for realization) for music piece A specified by the user is called an explanation accuracy degree. Let DP(i, j) be the explanation accuracy degree, where i=0, ..., N−1; j=0, ..., M.

Figure 9:
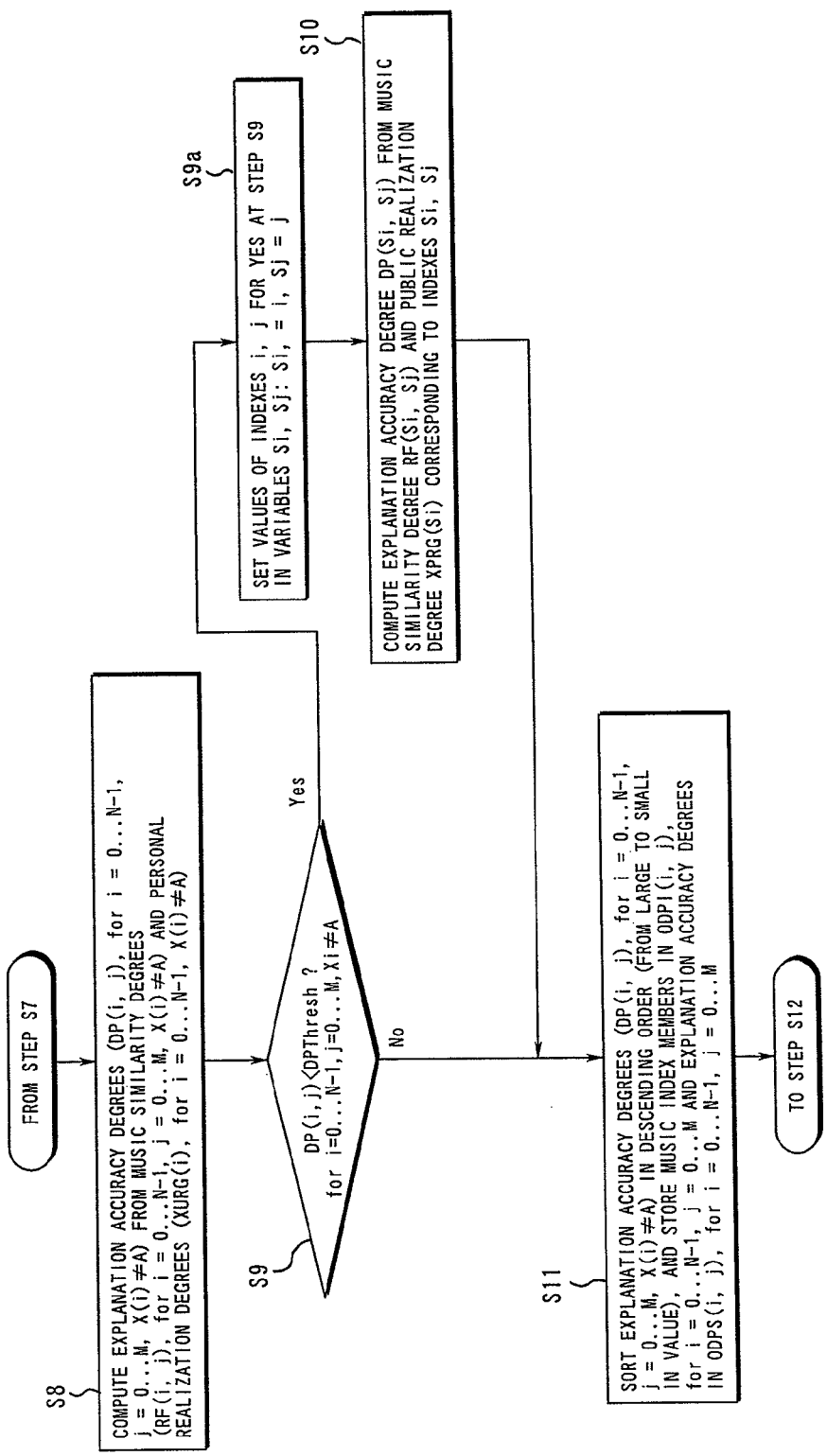
FIG. 9 is a flow chart showing an explanation accuracy degree computation operation.

In the explanation accuracy degree computation operation, as shown in FIG. 9, first the explanation accuracy degrees DP(i, j) are computed using the similarity degrees RF(i, j) computed at step S3 and the personal realization degrees XURG(i) computed at step S5 (step S8). In the computation of the explanation accuracy degrees DP(i, j) at step S8, the equation (6) is used. Note that for such a value of index i that music piece X(i) is music piece A, the output value is set to −1, thereby excluding it from subsequent computations.

[Expression 6]

$$DP(i, j) = \begin{cases} RF(i, j) \times XURG(i) \\ -1, \quad A = X(i) \end{cases} \quad (6)$$

for $i = 0 \dots N - 1$,
$j = 0 \dots M$

Next, it is determined whether the explanation accuracy degree DP(i, j) computed at step S8 is less than a threshold value DPThresh (a first threshold value) (step S9). If it is determined that the explanation accuracy degree DP(i, j) is less than DPThresh at step S9, the values of the indexes i, j are set in variables Si, Sj (step S9a), and then the explanation accuracy degree DP(i, j) is recomputed using the music similarity degree RF(Si, Sj) computed at step S3 and the public realization degree XPRG(Si) computed at step S6 (step S10). In the computation of the explanation accuracy degree DP(i, j) at step S10, the equation (7) is used:

[Expression 7]

$$DP(Si, Sj) = RF(Si, Sj) \times XPRG(Si) \tag{7}$$

If it is determined that the explanation accuracy degree DP(i, j) is at or above DPThresh at step S9, the process proceeds to step S11 described later. After the re-computation of the explanation accuracy degree DP(i, j) at step S10, the process also proceeds to step S11.

The threshold value DPThresh is an adjustable parameter based on which to determine the validity of the explanation accuracy degree computed using the personal realization degree XURG(i). If the explanation accuracy degree DP(i, j) is less than DPThresh, the personal realization degree is determined to be low, and hence the explanation accuracy degree is computed using the public realization degree at step S10. This is because: to explain music piece A specified by the user, the personal realization degree is prioritized since music information whose degree of familiarity to the individual user is high is essentially desirable, but if it is low, the explanation accuracy degree is supplemented with the degree of oftenhearing, etc., due to public or external factors, thereby selecting music pieces of high explanation accuracy degrees.

At step S11, letting ODPI(i, j) (where i=0, . . . , N−1; j=0, . . . , M) be music piece index members and ODPS(i, j) (where i=0, . . . , N−1; j=0, . . . , M) be sorted explanation accuracy degrees anew, the explanation accuracy degrees DP(i, j) are sorted in descending order (from large to small in numerical value), and the sorted values are stored as the explanation accuracy degrees ODPS(i, j). This is preparation for processing music information of high explanation accuracy degrees at step S12 and later.

Figure 10:
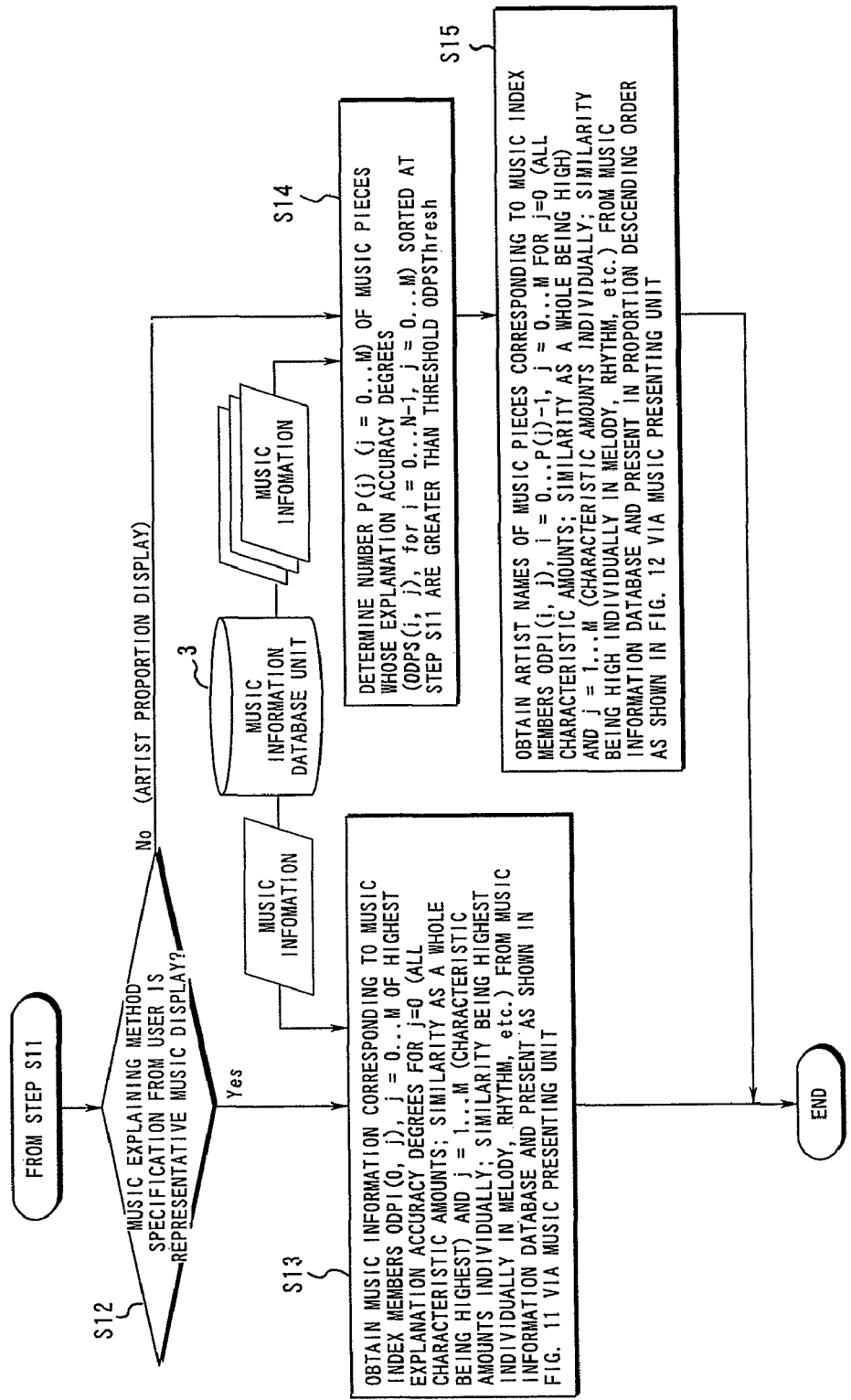
FIG. 10 is a flow chart showing a music explaining method determining operation.

After the explanation accuracy degree computation, a music explaining method determining operation is performed in the music explaining method determining unit 9. In the music explaining method determining operation, as shown in FIG. 10, first it is determined whether the music explaining method specification from the user indicates representative music display or artist proportion display (step S12).

Figure 11:
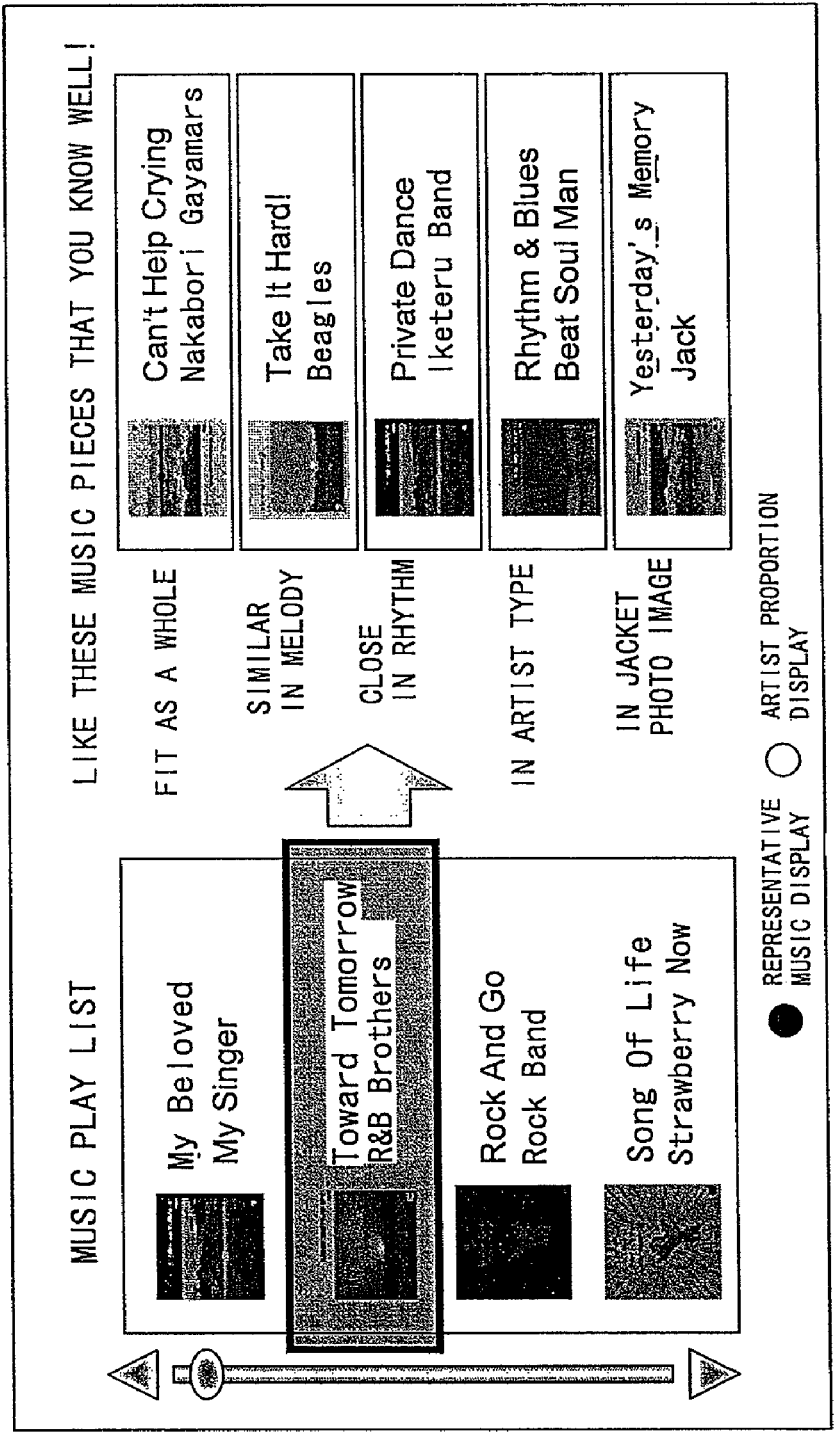
FIG. 11 shows a display example in the case of representative music display.

Next, if the specification from the user is the representative music display, music information corresponding to the music piece index members ODPI(0, j) of the highest explanation accuracy degrees for the case of using all the characteristic amounts as the indicator of similarity in characteristics between music pieces (j=0; similarity as a whole being the highest) and the cases of using the characteristic amounts individually (j=1, . . . , M; similarity being the highest individually in information such as melody and rhythm) are obtained from the music information database unit 3 and are presented as music piece explaining information via the music information presenting unit 10 (step S13). For the representative music display specification, music piece explaining information is displayed as shown in, e.g., FIG. 11. In the case of the representative music display specification, for a music piece specified by the user (the music piece at the cursor position in the music piece play list of FIG. 11), a music piece is shown for each of "fit as a whole", "similar in melody", "close in rhythm", "in artist type", and "in jacket photo image".

In contrast, if the specification from the user is the artist proportion display, the number P(j) (where j=0, . . . , M) of music pieces whose explanation accuracy degrees ODPS(i, j) sorted at step S11 are greater than a threshold value ODPSThresh is determined (step S14). The threshold value ODPSThresh is an adjustable parameter to determine the performance of the music piece explanation output.

Figure 12:
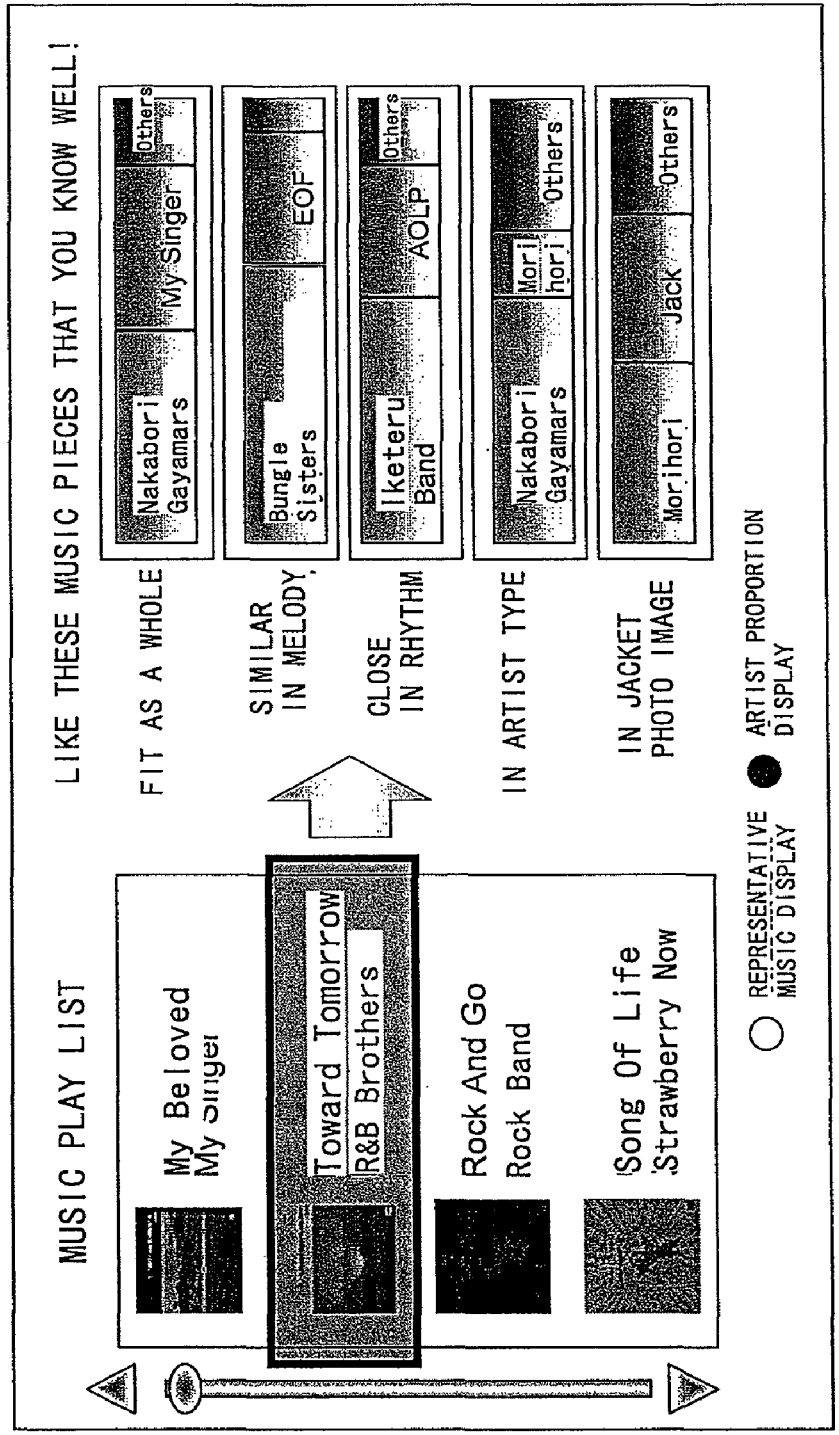
FIG. 12 shows a display example in the case of artist proportion display.

Then, the artist names of the music pieces corresponding to the music piece index members ODPI(i, j) for the case of using all the characteristic amounts as the indicator of similarity in characteristics between music pieces (j=0; similarity as a whole being high) and the cases of using the characteristic amounts individually (j=1, . . . , M; similarity being high individually in information such as melody and rhythm) are obtained from the music information database unit 3 and are presented as music piece explaining information in their proportion descending order via the music information presenting unit 10 (step S15). For the artist proportion display specification, music piece explaining information is displayed as shown in, e.g., FIG. 12. In the case of the artist proportion display specification, for a music piece specified by the user (the music piece at the cursor position in the music piece play list of FIG. 12), artist names are shown for each of "fit as a whole", "similar in melody", "close in rhythm", "in artist type", and "in jacket photo image".

Further, in the music piece explaining apparatus, an updating operation is performed to register a new music piece in the music information database unit 3 and the user management database unit 4. This updating operation is performed independently of the aforementioned operations and can be performed at any timing except during the music piece specification by the user and during the presenting of music explaining information. For example, it may be performed in the night when the system is in a standby state.

Figure 13:
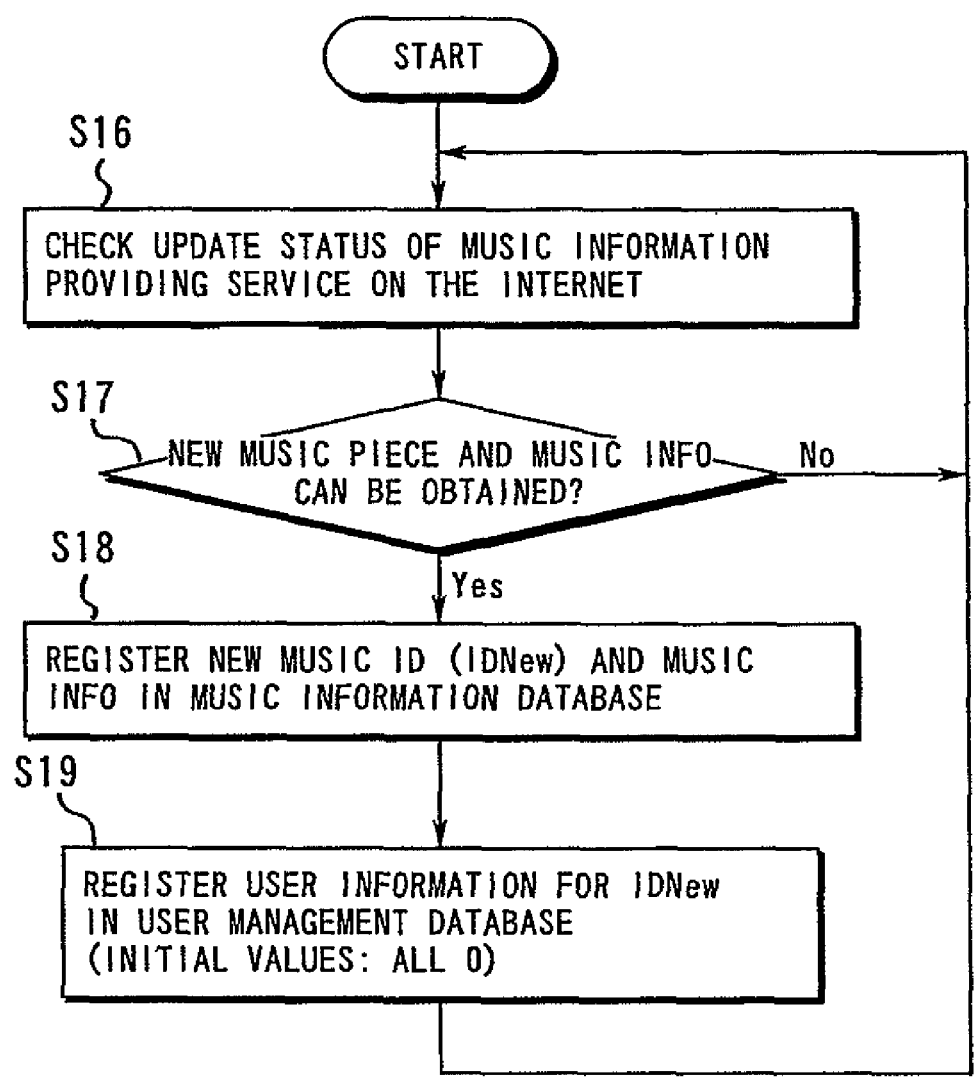
FIG. 13 is a flow chart showing an updating operation.

In the updating operation, as shown in FIG. 13, the update status of a music information providing service (server) on the Internet is checked periodically (step S16). Next, it is determined whether a new music piece and its music information can be obtained from that service (step S17). If information can be obtained at step S17, letting IDNew be an identifier (music ID in the music information database unit 3) of the new music piece and music information, the music information is registered as new music information in the music information database unit 3 (step S18). Then, an area for user information for the music ID=IDNew is also secured in the user management database unit 4 (step S19). At this time, attribute values such as the number of play times in the user management database unit 4 are set to 0.

On the other hand, if information cannot be obtained at step S17, the process returns to step S16 and the above processes are repeated.

As such, the music piece explaining apparatus of the present invention presents other music information similar in information contents (music characteristics, bibliographic information, the characteristics of an image such as a jacket photo, etc.) to music piece A specified by the user and easy for the user to realize, according to the plurality of indicators of similarity (as a whole, melody, rhythm, etc.). Thus, the user can infer the contents of an unknown or unfamiliar music piece from music pieces that the user ordinarily listens to or often hears.

Therefore, even if a music piece presented is unknown, the user does not need to listen thereto like with a conventional apparatus, and even if the user does not own the presented music piece in the form of playable music data, the user can realize it, and thus the load on the user to realize the unknown music piece can be greatly reduced. Further, even if a specified music piece A is known to the user, other music pieces that deserve explaining it are presented, which helps the user to deepen the understanding of the specified music piece.

Moreover, if the specification from the user is the representative music display, the contents of the music piece can be realized through them, and in the case of the artist proportion display specification, they can be realized through the attribute "artist" easy for humans to imagine.

Figure 14:
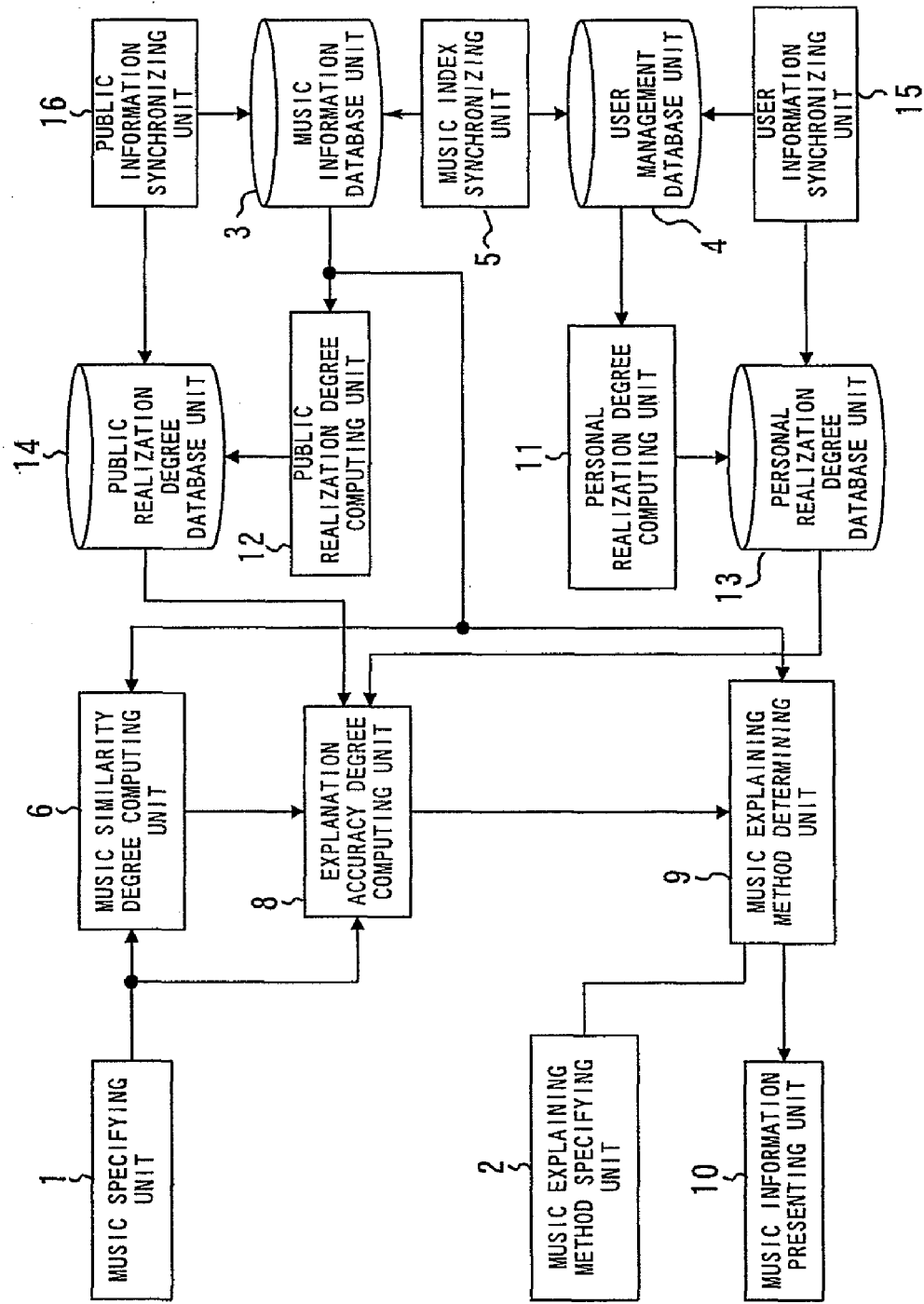
FIG. 14 is a block diagram showing the configuration of a music piece explaining apparatus as another embodiment of the present invention.

FIG. 14 shows another embodiment of the present invention. The music piece explaining apparatus of FIG. 14 comprises a personal realization degree computing unit 11 and a public realization degree computing unit 12 instead of the user realization degree computing unit 7 of FIG. 1. The music piece explaining apparatus of FIG. 14 further comprises a personal realization degree database unit 13, a public realization degree database unit 14, a user information synchronizing unit 15, and a public information synchronizing unit 16.

The personal realization degree computing unit 11 computes the realization degree of an individual user and stores the computed personal realization degree in the personal realization degree database unit 13. The public realization degree computing unit 12 computes the public realization degree and stores the computed public realization degree in the public realization degree database unit 14.

The explanation accuracy degree computing unit 8 computes the degrees of explanation accuracy, for the music piece specified by the music specifying unit 1, of all the music pieces stored in the music information database unit 3, using the computing results of the music similarity degree computing unit 6 and the computed personal realization degree and the computed public realization degree respectively stored in the personal realization degree database unit 13 and the public realization degree database unit 14.

The user information synchronizing unit 15 associates the user management database unit 4 with the personal realization degree database unit 13 in terms of music piece index members (music piece IDs). The public information synchronizing unit 16 associates the music information database unit 3 with the public realization degree database unit 14 in terms of music piece index members (music piece IDs).

The others, i.e., the music specifying unit 1, the music explaining method specifying unit 2, the music information database unit 3, the user management database unit 4, the music index synchronizing unit 5, the music similarity degree computing unit 6, the music explaining method determining unit 9, and the music information presenting unit 10 are the same as in the music piece explaining apparatus of FIG. 1.

Figure 15:
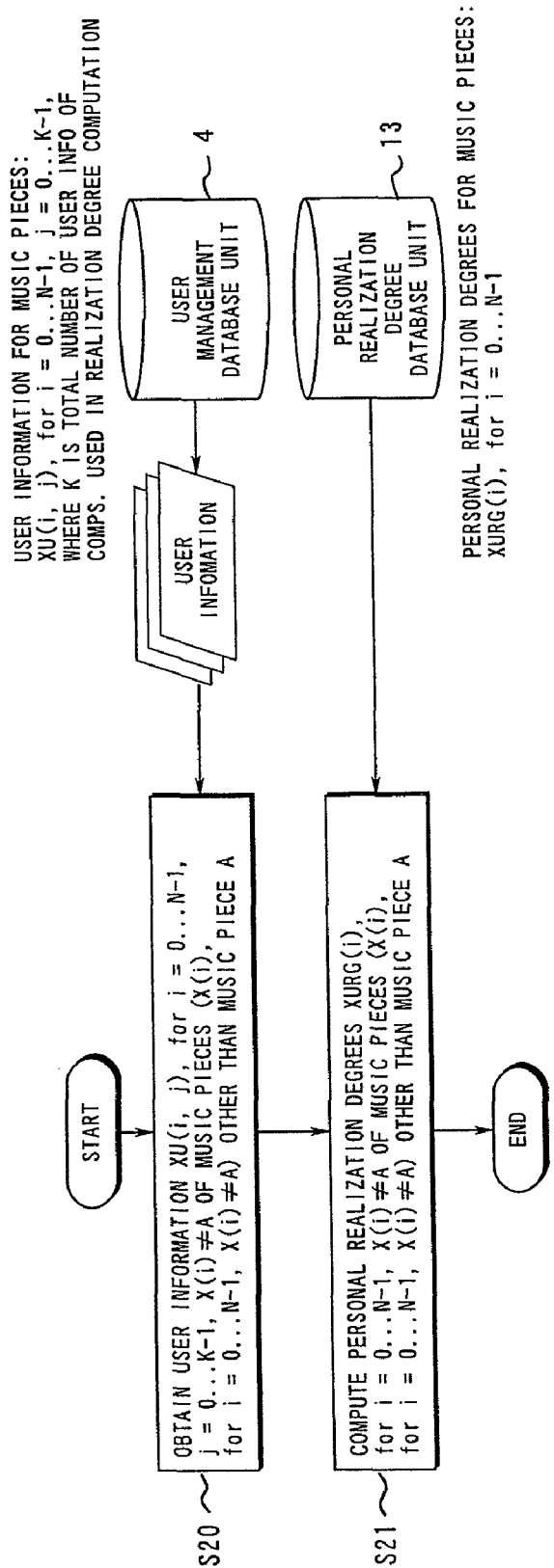
FIG. 15 is a flow chart showing a personal realization degree computation operation in the apparatus of FIG. 14.

In the music piece explaining apparatus of FIG. 14, the personal realization degree computing unit 11 performs a personal realization degree computation operation (steps S20 and S21) as shown in FIG. 15. The computation operation itself of these steps S20, S21 is the same as that of steps S4, S5 of FIG. 8. At step S21, the computed personal realization degrees XURG(i) (where i=0, . . . , N−1; X(i)≠A) are stored into the personal realization degree database unit 13.

Figure 16:
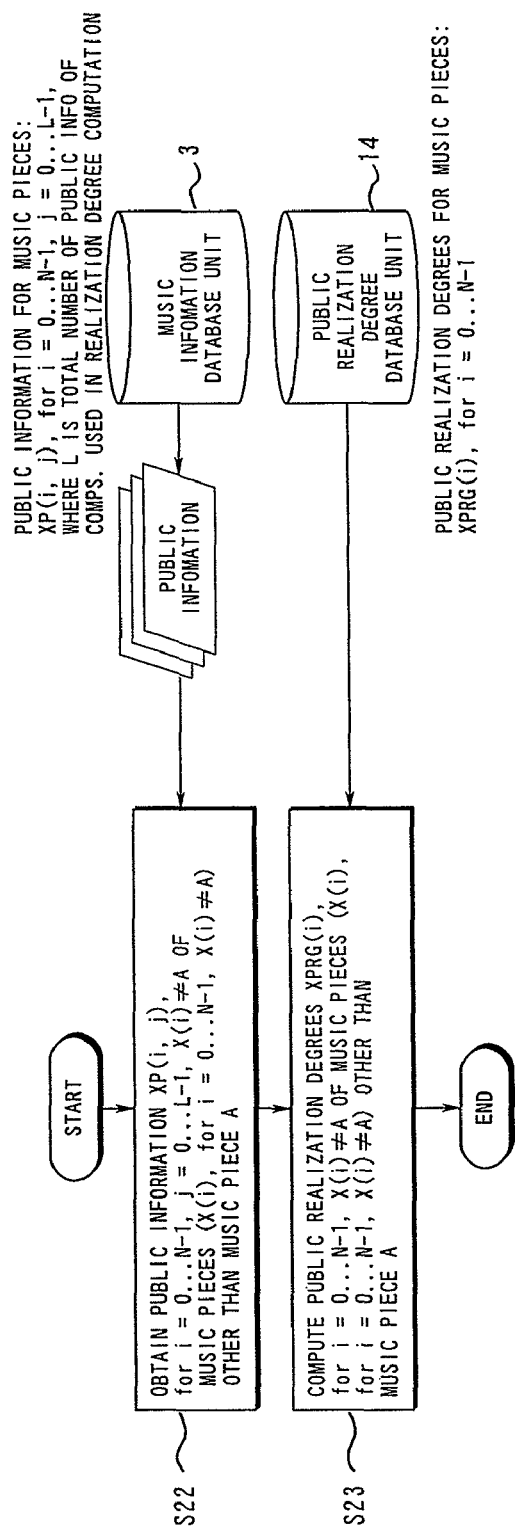
FIG. 16 is a flow chart showing a public realization degree computation operation in the apparatus of FIG. 14.

The public realization degree computing unit 12 performs a public realization degree computation operation (steps S22 and S23) as shown in FIG. 16. The computation operation itself of these steps S22, S23 is the same as that of steps S6, S7 of FIG. 8. At step S23, the computed public realization degrees XPRG(i) (where i=0, . . . , N−1; X(i)≠A) are stored into the public realization degree database unit 14.

These database units 13 and 14 may be updated or recalculated synchronously with the changing of the user information in the user management database unit 4 and the public information in the music information database unit 3, or each time explanation accuracy degrees are calculated.

Figure 17:
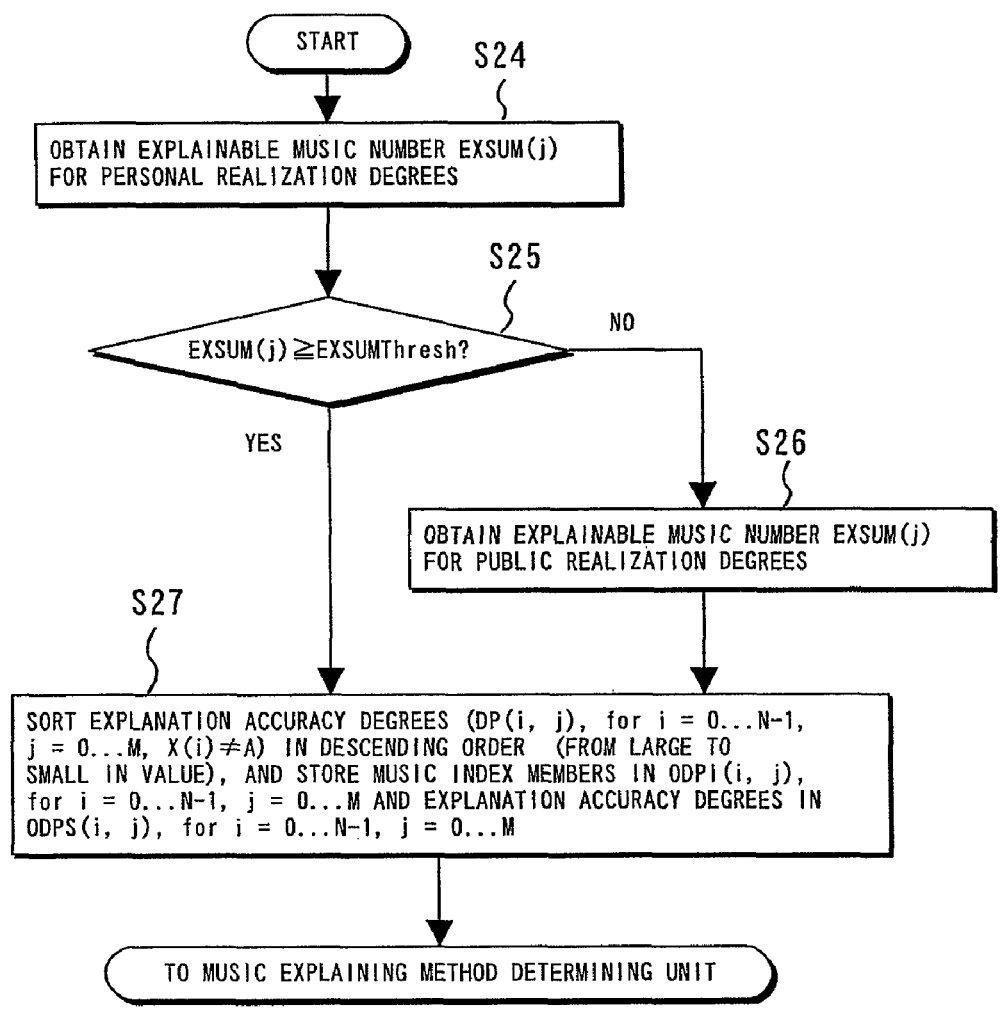
FIG. 17 is a flow chart showing an explanation accuracy degree computation operation in the apparatus of FIG. 14.

As to the music piece explaining apparatus of FIG. 14, in the explanation accuracy degree computation operation performed by the explanation accuracy degree computing unit 8, as shown in FIG. 17, first the number of music pieces of high explanation accuracy degrees (greater than a predetermined value) from among the music pieces whose personal realization degrees, stored in the personal realization degree database unit 13, are high is obtained as the number of explainable music pieces EXSUM(j) (step S24). It is determined whether or not the obtained number of explainable music pieces EXSUM(j) is at or above a threshold value EXSUMThresh (a second threshold value) (step S25). If EXSUM(j)≧EXSUMThresh, which means that an enough number of music pieces to explain are obtained, then the explanation accuracy degrees DP(i, j) are sorted in descending order (from large to small in numerical value), and the sorted values are stored as the explanation accuracy degrees ODPS(i, j) in order to explain to the user using these music pieces (step S27). If EXSUM(j)<EXSUMThresh, which means that an enough number of music pieces to explain are not obtained, then the number of music pieces of high explanation accuracy degrees from among the music pieces whose public realization degrees, stored in the public realization degree database unit 14, are high is obtained as the number of explainable music pieces EXSUM(j) (step S26). Thereafter, step S27 is executed.

By this means, for a user who has many music pieces of high personal realization degrees, the computation of the music similarity degrees between a specified music piece and music pieces of low personal realization degrees including music pieces of high public realization degrees can be omitted, and hence the explanation accuracy degree computation can be efficiently performed.

Figure 18:
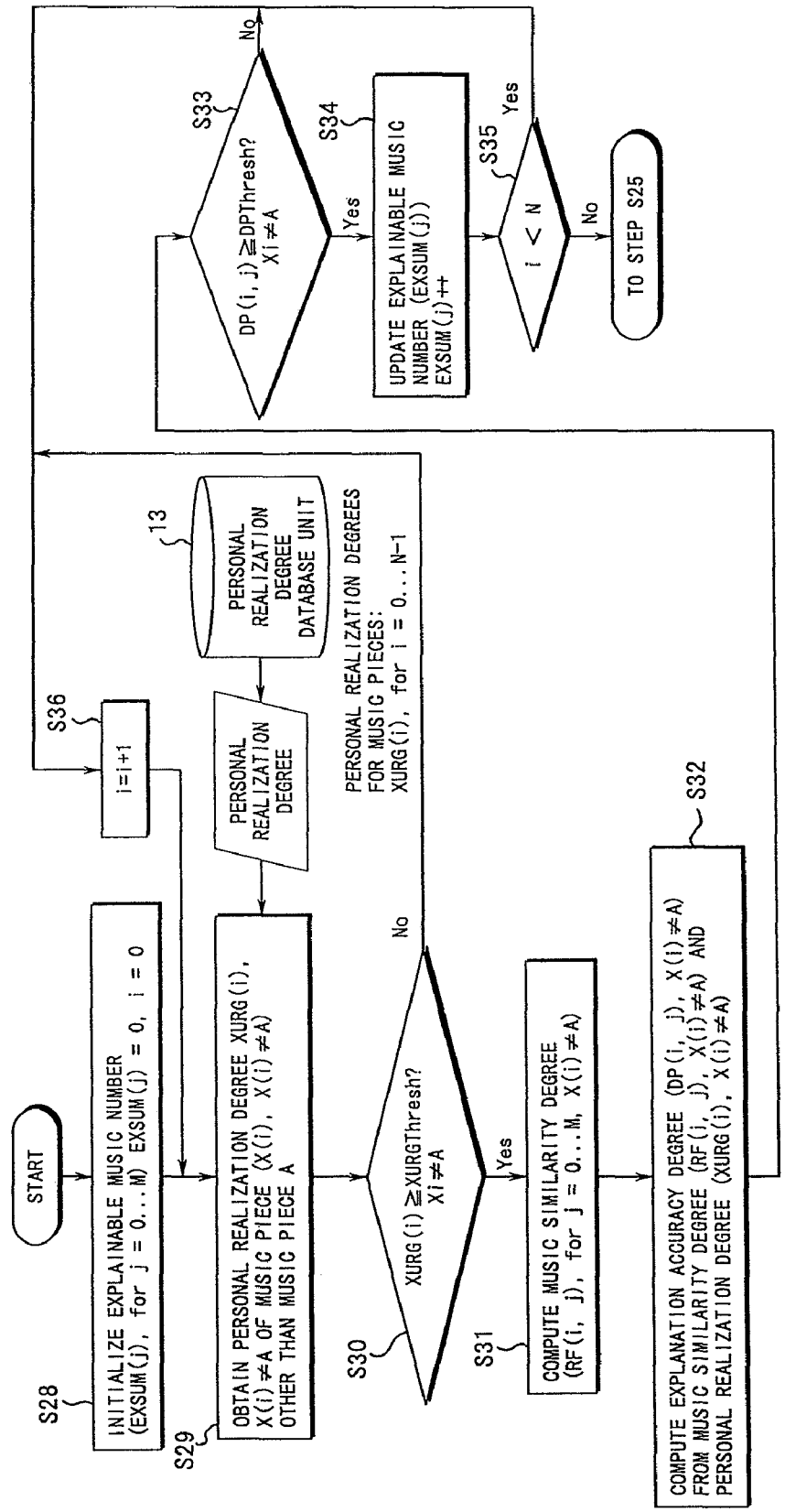
FIG. 18 is a flow chart showing a method of calculating explanation accuracy degrees in the operation of FIG. 17.

In the calculation of explanation accuracy degrees using personal realization degrees in step S24, as shown in FIG. 18, first the explainable music piece number EXSUM(j) is initialized (step S28). Thereafter, the personal realization degree of a music piece X(i) other than specified music piece A is obtained as XURG(i) from the personal realization degree database unit 13 (step S29). Then, it is determined whether the XURG(i) is less than a threshold value XURGThresh (step S30). If XURG(i)<XURGThresh, i is incremented (step S36). Thereafter, the above step S29 is executed again.

If it is determined at step S30 that XURG(i) is at or above XURGThresh, the degree RF(i, j) of a music piece similarity to the music piece A specified by the user is calculated (step S31), and the explanation accuracy degree DP(i, j) is computed at step S32. The details of the music similarity degree computation operation at step S31 are as shown in FIG. 5. The step S32 corresponds to the step S8 in the explanation accuracy degree computation operation of FIG. 9. It is determined whether or not the explanation accuracy degree DP(i, j) computed at step S32 is at or above the threshold value DPThresh (step S33). If DP(i, j)<DPThresh, i is incremented (step S36). Thereafter, the above step S29 is executed again. If DP(i, j)≧DPThresh, the explainable music piece number EXSUM(j) is incremented (step S34). If i is less than N (step S35), i is incremented (step S36). Thereafter, the above step S29 is executed again. If i≧N, the above step S25 is executed.

The calculation of explanation accuracy degrees using public realization degrees in step S26 can be performed like the calculation of explanation accuracy degrees using personal realization degrees.

While in the above embodiments description has been made with the contents being music pieces, the same mechanism can be applied to other contents such as movies imposing a load in watching and listening, and books. In this case, a variety of information in FIG. 2 need only be replaced with attributes of the contents such as movies or books, and the operations can be the same as those described for music pieces in the above embodiments.

A program to execute the method of explaining contents such as music pieces shown in the above embodiments may be recorded on a recording medium such as a disk, and the content explaining method may be executed by a computer reading out the program recorded on the recording medium.

The invention claimed is:

1. A content explaining apparatus for explaining a content, comprising:
   a content specifying unit which specifies a content to be explained from among a plurality of contents;
   a content information database unit which stores content information concerning each of said plurality of contents;
   a user management database unit which stores user information concerning each of said plurality of contents;
   a similarity degree computing unit which computes a degree of similarity between the content specified by said content specifying unit and each remaining content other than the specified content of said plurality of contents based on the content information stored in said content information database unit;
   a user realization degree computing unit which computes a user realization degree for each remaining content based on the user information stored in said user management database unit or the content information stored in said content information database unit;
   an explanation accuracy degree computing unit which computes a degree indicating an explanation level for the specified content of each remaining content as an explanation accuracy degree based on a computing result of said similarity degree computing unit and a computing result of said user realization degree computing unit; and
   an explanation presenting unit which presents content explaining information for said specified content in accordance with explanation accuracy degrees that are computing results of said explanation accuracy degree computing unit,
   wherein said user realization degree computing unit computes, as types of said user realization degree, a personal realization degree of each remaining content for each attribute of the user information stored in said user management database unit and a public realization degree of each remaining content for each attribute of public information of the content information stored in said content information database unit, and
   wherein said explanation accuracy degree computing unit multiplies the similarity degree computed by said similarity degree computing unit for each attribute of the content information stored in said content information database unit and the personal realization degree computed by said user realization degree computing unit and, if a result of the multiplication is equal to or larger than a first threshold value, sets the multiplication result as said explanation accuracy degree, and if the multiplication result is less than said first threshold value, calculates said explanation accuracy degree by multiplying the similarity degree computed by said similarity degree computing unit for each attribute of the corresponding content information stored in said content information database unit and said public realization degree computed by said user realization degree computing unit.

2. The content explaining apparatus according to claim 1, wherein said similarity degree computing unit computes the similarity degree between said specified content and each remaining content for each attribute of the content information stored in said content information database unit.

3. The content explaining apparatus according to claim 1, wherein said explanation accuracy degree computing unit calculates the explanation accuracy degree for each attribute of the content information stored in said content information database unit, by multiplying a computing result of said similarity degree computing unit and a corresponding computing result of said user realization degree computing unit.

4. The content explaining apparatus according to claim 1, wherein said explanation accuracy degree computing unit sorts said explanation accuracy degrees calculated for each attribute in order of from large to small in numerical value and outputs the sorted explanation accuracy degrees.

5. The content explaining apparatus according to claim 1, wherein said explanation accuracy degree computing unit comprises:
   a first explainable music piece number calculating unit which calculates the number of music pieces whose explanation accuracy degrees calculated using said personal realization degrees computed by said user realization degree computing unit are greater than a predetermined value, as explainable music piece number, for each attribute of the content information stored in said content information database unit; and
   a second explainable music piece number calculating unit, if said explainable music piece number is less than a second threshold value, which calculates the number of music pieces whose explanation accuracy degrees calculated using said public realization degrees computed by said user realization degree computing unit are greater than a predetermined value, as said explainable music piece number, for each attribute of the content information stored in said content information database unit, and
   wherein said explanation accuracy degree computing unit sorts said explanation accuracy degrees calculated for each of said multiple attributes when calculating said explainable music piece number by said first explainable music piece number calculating unit or said second explainable music piece number calculating unit in order of from large to small in numerical value and outputs the sorted explanation accuracy degrees.

6. The content explaining apparatus according to claim 1, wherein said explanation presenting unit comprises:
   a content explaining method specifying unit which specifies a display method, either representative content display or artist proportion display;
   a content explaining method determining unit which determines said content explaining information for said specified content that is displayed in the display method specified by said content explaining method specifying unit, based on the content information stored in said content information database unit for contents whose explanation accuracy degrees computed by said explanation accuracy degree computing unit are high; and
   a content information presenting unit which displays said content explaining information determined by said content explaining method determining unit.

7. The content explaining apparatus according to claim 6, wherein said content explaining method determining unit determines said content explaining information for said specified content based on the content information stored in said content information database unit respectively for contents whose explanation accuracy degrees, which each are computed from all attributes of the content information in said content information database unit by said explanation accuracy degree computing unit, are high and contents whose explanation accuracy degrees, which each are computed from one of the attributes by said explanation accuracy degree computing unit, are high.

8. The content explaining apparatus according to claim 7, wherein the attributes of the content information stored in said content information database unit are related to bibliographic information, music characteristic amounts, image characteristic amounts, and public information.

9. The content explaining apparatus according to claim 1, wherein when a new content and content information of the new content can be obtained, the new content information is stored in association with a new identifier into said content information database unit, and a user information storage area with an identifier identical to the new identifier in said content information database unit is secured in said user management database unit.

10. A content explaining method of an apparatus for explaining a content, comprising:
 a content specifying step of specifying a content to be explained from among a plurality of contents;
 a similarity degree computing step of computing a degree of similarity between the content specified in said content specifying step and each remaining content other than the specified content of the plurality of contents based on content information stored in a content information database unit;
 a user realization degree computing step of computing a user realization degree for each remaining content based on user information stored in a user management database unit or the content information stored in said content information database unit;
 an explanation accuracy degree computing step of computing a degree indicating an explanation level for the specified content of each remaining content as an explanation accuracy degree based on a computing result of said similarity degree computing step and a computing result of said user realization degree computing step; and
 an explanation presenting step of presenting content explaining information for said specified content in accordance with explanation accuracy degrees that are computing results of said explanation accuracy degree computing step,
 wherein a personal realization degree of each remaining content for each attribute of the user information stored in said user management database unit and a public realization degree of each remaining content for each attribute of public information of the content information stored in said content information database unit are computed as types of said user realization degree in said user realization degree computing step, and
 wherein in said explanation accuracy degree computing step, the similarity degree computed by said similarity degree computing step for each attribute of the content information stored in said content information database unit and the personal realization degree computed by said user realization degree computing step are multiplied and, if a result of the multiplication is equal to or larger than a first threshold value, the multiplication result is set as said explanation accuracy degree, and if the multiplication result is less than said first threshold value, said explanation accuracy degree is set by multiplying the similarity degree computed by said similarity degree computing step for each attribute of the corresponding content information stored in said content information database unit and said public realization degree computed by said user realization degree computing step.

11. A computer program stored in a computer-readable medium to execute a content explaining method of explaining a content, the program comprising:
 a content specifying step of specifying a content to be explained from among a plurality of contents;
 a similarity degree computing step of computing a degree of similarity between the content specified in said content specifying step and each remaining content other than the specified content of the plurality of contents based on content information stored in a content information database unit;
 a user realization degree computing step of computing a user realization degree for each remaining content based on user information stored in a user management database unit or the content information stored in said content information database unit;
 an explanation accuracy degree computing step of computing a degree indicating an explanation level for the specified content of each remaining content as an explanation accuracy degree based on a computing result of said similarity degree computing step and a computing result of said user realization degree computing step; and
 an explanation presenting step of presenting content explaining information for said specified content in accordance with explanation accuracy degrees that are computing results of said explanation accuracy degree computing step,
 wherein a personal realization degree of each remaining content for each attribute of the user information stored in said user management database unit and a public realization degree of each of each remaining content for each attribute of public information of the content information stored in said content information database unit are computed as types of said user realization degree in said user realization degree computing step, and
 wherein in said explanation accuracy degree commuting step, the similarity degree computed by said similarity degree computed step for each attribute of the content information stored in said content information database unit and the personal realization degree computed by said user realization degree computing step are multiplied and, if a result of the multiplication is equal to or larger than a first threshold value, the multiplication result is set as said explanation accuracy degree, and if the multiplication result is less than said first threshold, said explanation accuracy degree is set by multiplying the similarity degree computed by said similarity degree computing step for each attribute of the corresponding content information stored in said content information database unit and said public realization degree computed by said user realization degree computing step.

* * * * *